(12) United States Patent
Kamen et al.

(10) Patent No.: US 7,157,875 B2
(45) Date of Patent: Jan. 2, 2007

(54) METHOD AND SYSTEM FOR FAIL-SAFE MOTOR OPERATION

(75) Inventors: Dean Kamen, Bedford, NH (US); John B. Morrell, Bedford, NH (US); David W. Robinson, Manchester, NH (US); Ronald K. Reich, Merrimack, NH (US); John David Heinzmann, Manchester, NH (US); Philip LeMay, Bedford, NH (US); Steven R. Meyer, North Reading, MA (US); Jason M. Sachs, Goffstown, NH (US); J. Douglas Field, Bedford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 11/273,581

(22) Filed: Nov. 14, 2005

(65) Prior Publication Data
US 2006/0125433 A1 Jun. 15, 2006

Related U.S. Application Data

(60) Division of application No. 10/307,892, filed on Dec. 2, 2002, now Pat. No. 6,965,206, which is a continuation-in-part of application No. 09/687,789, filed on Oct. 13, 2000, now Pat. No. 6,581,714.

(51) Int. Cl.
*G05B 9/03* (2006.01)

(52) U.S. Cl. ...................... 318/434; 310/112; 318/564

(58) Field of Classification Search .............. 318/434, 318/563–565; 388/903; 361/23–34; 310/101, 310/112
See application file for complete search history.

(56) References Cited

U.S. PATENT DOCUMENTS

| 584,127 A | 6/1897 | Draullette et al. |
| 849,270 A | 4/1907 | Schafer et al. |
| 2,742,973 A | 4/1956 | Johannesen |
| 3,145,797 A | 8/1964 | Taylor |
| 3,260,324 A | 7/1966 | Suarez |
| 3,283,398 A | 11/1966 | Andren |
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |

(Continued)

FOREIGN PATENT DOCUMENTS

DE 2 048 593 5/1971

(Continued)

OTHER PUBLICATIONS

Kawaji, S., "Stabilization of Unicycle Using Spinning Motion", Denki Gakkai Ronbushi, D., vol. 107, Issue 1, Japan 1987, pp. 21-28.

(Continued)

*Primary Examiner*—Bentsu Ro
(74) *Attorney, Agent, or Firm*—Bromberg & Sunstein LLP

(57) ABSTRACT

An electric device includes a motor and a motor drive for commanding a torque generated by the motor. A fault control circuit detects a fault condition associated with the motor drive. Upon detection of the fault condition, the fault control circuit adjusts the torque commanded by the motor drive.

11 Claims, 10 Drawing Sheets

U.S. PATENT DOCUMENTS

| | | |
|---|---|---|
| 3,515,401 A | 6/1970 | Gross |
| 3,568,018 A | 3/1971 | Macdonald ................. 318/151 |
| 3,580,344 A | 5/1971 | Floyd |
| 3,582,712 A | 6/1971 | Blair ........................... 461/125 |
| 3,596,298 A | 8/1971 | Durst, Jr. |
| 3,803,473 A | 4/1974 | Stich .......................... 388/829 |
| 3,860,264 A | 1/1975 | Douglas et al. |
| 3,872,945 A | 3/1975 | Hickman et al. |
| 3,952,822 A | 4/1976 | Udden et al. |
| 4,018,440 A | 4/1977 | Deutsch |
| 4,062,558 A | 12/1977 | Wasserman |
| 4,076,270 A | 2/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,151,892 A | 5/1979 | Francken |
| 4,222,449 A | 9/1980 | Felix |
| 4,264,082 A | 4/1981 | Fouchey, Jr. |
| 4,266,627 A | 5/1981 | Lauber |
| 4,270,164 A | 5/1981 | Wyman et al. .......... 363/56.03 |
| 4,293,052 A | 10/1981 | Daswick et al. |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,426,611 A * | 1/1984 | Espelage et al. ............ 318/803 |
| 4,434,389 A | 2/1984 | Langley et al. ............. 318/254 |
| 4,510,956 A | 4/1985 | King |
| 4,536,686 A | 8/1985 | Gartner ....................... 318/434 |
| 4,550,267 A | 10/1985 | Vaidya ........................ 310/184 |
| 4,560,022 A | 12/1985 | Kassai |
| 4,566,707 A | 1/1986 | Nitzberg |
| 4,571,844 A | 2/1986 | Komasaku et al. |
| 4,607,205 A | 8/1986 | Kito et al. .................. 318/778 |
| 4,624,469 A | 11/1986 | Bourne, Jr. |
| 4,657,272 A | 4/1987 | Davenport |
| 4,685,693 A | 8/1987 | Vadjunec |
| 4,709,772 A | 12/1987 | Brunet |
| 4,740,001 A | 4/1988 | Torleumke |
| 4,746,132 A | 5/1988 | Eagan |
| 4,746,843 A | 5/1988 | Taenzer ....................... 318/138 |
| 4,770,410 A | 9/1988 | Brown |
| 4,786,069 A | 11/1988 | Tang |
| 4,790,400 A | 12/1988 | Sheeter |
| 4,790,548 A | 12/1988 | Decelles et al. |
| 4,794,999 A | 1/1989 | Hester |
| 4,798,255 A | 1/1989 | Wu |
| 4,802,542 A | 2/1989 | Houston et al. |
| 4,806,839 A * | 2/1989 | Nagato et al. ............... 318/798 |
| 4,809,804 A | 3/1989 | Houston et al. |
| 4,834,200 A | 5/1989 | Kajita |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,919,225 A | 4/1990 | Sturges |
| 4,953,851 A | 9/1990 | Sherlock et al. |
| 4,984,754 A | 1/1991 | Yarrington |
| 4,985,947 A | 1/1991 | Ethridge |
| 4,998,596 A | 3/1991 | Miksitz |
| 4,999,552 A | 3/1991 | Seipelt ....................... 318/434 |
| 5,002,295 A | 3/1991 | Lin |
| 5,011,171 A | 4/1991 | Cook |
| 5,052,237 A | 10/1991 | Reimann |
| 5,057,962 A | 10/1991 | Alley et al. ................. 361/124 |
| 5,111,899 A | 5/1992 | Reimann |
| 5,158,493 A | 10/1992 | Morgrey |
| 5,168,947 A | 12/1992 | Rodenborn |
| 5,171,173 A | 12/1992 | Henderson et al. |
| 5,186,270 A | 2/1993 | West |
| 5,221,883 A | 6/1993 | Takenaka et al. |
| 5,241,875 A | 9/1993 | Kochanneck |
| 5,248,007 A | 9/1993 | Watkins et al. |
| 5,303,156 A | 4/1994 | Matsuoka et al. ............ 701/43 |
| 5,314,034 A | 5/1994 | Chittal |
| 5,350,033 A | 9/1994 | Kraft |
| 5,366,036 A | 11/1994 | Perry |
| 5,499,186 A * | 3/1996 | Carosa ........................ 363/132 |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,928,366 A | 7/1999 | Kawasaki ................... 713/601 |
| 5,929,549 A | 7/1999 | Trago et al. ................. 310/198 |
| 5,971,091 A | 10/1999 | Kamen et al. |
| 5,975,225 A | 11/1999 | Kamen et al. |
| 6,003,624 A | 12/1999 | Jorgensen et al. |
| 6,059,062 A | 5/2000 | Staelin et al. |
| 6,118,246 A * | 9/2000 | Eyerly ......................... 318/696 |
| 6,125,957 A | 10/2000 | Kauffmann |
| 6,148,939 A | 11/2000 | Brookhart et al. .......... 180/6.48 |
| 6,170,598 B1 | 1/2001 | Furukawa ................... 180/334 |
| 6,246,232 B1 | 6/2001 | Okumura ................. 324/207.2 |
| 6,271,638 B1 | 8/2001 | Erdman et al. ............. 318/439 |
| 6,276,230 B1 | 8/2001 | Crum et al. |
| 6,288,505 B1 | 9/2001 | Heinzmann et al. ........ 318/139 |
| 6,297,573 B1 * | 10/2001 | Roth-Stielow et al. ..... 310/68 C |
| 6,334,084 B1 | 12/2001 | Moteki et al. |
| 6,759,823 B1 * | 7/2004 | Witzig ........................ 318/434 |

FOREIGN PATENT DOCUMENTS

| | | |
|---|---|---|
| DE | 31 28 112 | 2/1983 |
| DE | 32 42 880 | 6/1983 |
| DE | 34 11 489 | 10/1984 |
| DE | 298 08 091 | 10/1998 |
| DE | 298 08 096 | 10/1998 |
| EP | 0 109 927 | 7/1984 |
| EP | 0 193 473 | 9/1986 |
| EP | 0 537 698 | 4/1993 |
| FR | 980 237 | 5/1951 |
| FR | 82 04314 | 9/1982 |
| GB | 152664 | 2/1922 |
| GB | 1213930 | 11/1970 |
| GB | 2 139 576 | 11/1984 |
| JP | 52 44933 | 10/1975 |
| JP | 57 87766 | 6/1982 |
| JP | 57 110569 | 7/1982 |
| JP | 59 73372 | 4/1984 |
| JP | 62 12810 | 7/1985 |
| JP | 0255580 | 12/1985 |
| JP | 61 31685 | 2/1986 |
| JP | 2 190277 | 7/1990 |
| JP | 6 171562 | 12/1992 |
| JP | 5 213240 | 8/1993 |
| JP | 6 105415 | 12/1994 |
| JP | 7255780 | 3/1995 |
| JP | 63 305082 | 12/1998 |
| WO | WO 86/05752 | 10/1986 |
| WO | WO 89/06117 | 7/1989 |
| WO | WO 96/23478 | 8/1996 |

OTHER PUBLICATIONS

Schoonwinkel, A., "Design and Test of a Computer-Stabilized Unicycle", Stanford University 1988, UMI Dissertation Services.
Vos, D., Dynamics and Nonlinear Adaptive Control of an Autonomous Unicycle, Massachusetts Institute of Technology, 1989.
Vos, D., "Nonlinear Control of an Autonomous Unicycle Robot: Practical Issues", Massachusetts Institute of Technology, 1992.

Koyanagi et al., "A Wheeled Inverse Pendulum Type Self-Contained Mobile Robot and its Posture Control and Vehicle Control", The Society of Instrument and Control Engineers, Special issue of the 31st SICE Annual Conference, Japan 1992, pp. 13-16.

Koyanagi et al., "A Wheeled Inverse Pendulum Type Self-Contained Mobile Robot", The Society of Instrument and Control Engineers, Special Issue of the 31st SICE Annual Conference, Japan 1992, pp. 51-56.

Koyanagi et al., "A Wheeled Inverse Pendulum Type Self-Contained Mobile Robot and its Two Dimensional Trajectory Control", Proceeding of the Second Internatiional Symposium on Measurement and Control in Robotics, Japan 1992, pp. 891-898.

Watson Industries, Inc., Vertical Reference Manual ADS-C132-1A, 1992, pp. 3-4.

News article "Amazing Wheelchair Goes Up and Down Stairs", Publisher and date unknown.

Osaka et al., "Stabilization of unicycle", Systems and Control, vol. 25, No. 3, Japan 1981, pp. 159-166 (Abstract only).

Roy et al., "Five-Wheel Unicycle System", Medical & Biological Engineering & Computing, vol. 23, No. 6, United Kingdom 1985, pp. 593-596.

Kawaji, S., "Stabilization of Unicycle Using Spinning Motion", Denki Gakkai Ronbushi, D., vol. 107, Issue 1, Japan 1987, pp. 21-28 (Abstract only).

Schoonwinkel, A., "Design and Test of a Computer-Stabilized Unicycle", Disssertation Abstracts International, vol. 49/03-B, Stanford University 1988, pp. 890-1294 (Abstract only).

Vos et al., "Dynamics and Nonlinear Adaptive Control of an Autonomous Unicycle-Theory and Experiment", American Institute of Aeronautics and Astronautics, A90-26772 10-39, Washington, D.C. 1990, pp. 487-494 (Abstract only).

Tecknico's Home Page "Those Amazing Flying Machines", http://www.swiftsite.com/technico, 1999.

Stew's Hovercraft Page 1996, http://www.stewcam.com/hovercraft.html.

Welchko et al., "Fault Tolerant Three-Phase AC Motor Drive Topologies: A Comparison of Features, Cost, and Limitations", IEEE Transactions on Power Electronics, vol. 19, No. 4, Jul. 2004, pp. 1108-1116.

Ribeiro et al., "Fault-Tolerant Voltage-Fed PWM Inverter AC Motor Drive Systems", IEEE Transactions on Industrial Electronics, vol. 51, No. 2, Apr. 2004, pp. 439-446.

Jen-Ren Fu et al., "A Strategy to Isolate the Switching Device Fault of a Current Regulated Motor Drive", IEEE 1993, pp. 1015-1020.

* cited by examiner

|  | Unfaulted Drive | Unfaulted Drive Applied Voltage | Faulted Drive with $Q_{AL}$ Short | Faulted Drive Applied Voltage |
|---|---|---|---|---|
| $Q_{AH}$ | 5% | $V_A$=5V | 0% | $V_A$=0V |
| $Q_{AL}$ | 95% |  | 100% |  |
| $Q_{BH}$ | 40% | $V_B$=40V | 35% | $V_B$=35V |
| $Q_{BL}$ | 60% |  | 65% |  |
| $Q_{CH}$ | 95% | $V_C$=95V | 90% | $V_C$=90V |
| $Q_{CL}$ | 5% |  | 10% |  |

FIG. 7

METHOD AND SYSTEM FOR FAIL-SAFE MOTOR OPERATION

CROSS REFERENCE TO RELATED APPLICATIONS

The present application is a divisional application of U.S. application Ser. No. 10/307,892, filed Dec. 2, 2002, now U.S. Pat. No. 6,965,206, which in turn is a continuation-in-part of U.S. application Ser. No. 09/687,789, filed Oct. 13, 2000, now issued as U.S. Pat. No. 6,581,714. Each of the above-described applications is hereby incorporated by reference.

TECHNICAL FIELD AND BACKGROUND ART

The present invention relates to reduction or elimination of uncommanded torque in an electric device that includes, at least in part, a motor and a motor drive, in the event of failure.

Electric devices, that include, for example, a motor, are used for a wide variety of purposes. Many of these devices perform critical functions that affect human safety. For example, electric devices are often used in medical life support equipment or to drive a variety of transporters. Hence, it is often desirable that these devices have a high degree of reliability, and in many cases, a level of redundancy to prevent failure of the device.

Under normal circumstances, motor torque is commonly commanded by a motor drive 51, which regulates the flow of current from a power source 55 into the motor 52, as shown in FIG. 1 (prior art). The motor drive 51 typically includes a controller circuit 53 and a power stage 54, each of which might cause undesired values of current in the motor 52, which in turn causes undesired torque.

In some cases, failures lead to an open-circuited motor (i.e. zero current in the motor), which generally causes a loss of torque from the motor. One way to tolerate this failure mode is to use a motor with redundant windings and redundant drives, all sharing the required load torque, so that in the event of a loss of torque from a single winding and/or drive set, the remaining windings and drives can compensate and meet the necessary torque demands.

However, certain failure modes may cause undesired fault torque that remaining operating windings and drives are not able to overcome, regardless of the amount of redundancy provided. For example, motor terminals may be shorted together by the drive.

SUMMARY OF THE INVENTION

In accordance with a first embodiment of the invention there is provided an electric device that includes a motor. A motor drive commands torque to be generated by the motor. A fault control circuit adjusts the torque commanded by the motor drive based at least upon detection of a fault condition.

In related embodiments of the invention, the fault control circuit includes at least one relay, squib, and/or fuse for decoupling the motor drive from the motor. The at least one relay may be in a normally open position such that the motor drive is decoupled from the motor when the relay is not activated.

In yet another related embodiment of the invention, the fault control circuit controls, upon detection of the fault condition, the motor drive so as to reduce fault torque commanded by the motor drive. This may be accomplished, for example, by the fault control circuit adjusting a pulse duty-cycle of a signal applied to a winding of the motor.

In other related embodiments of the invention, the motor may have redundant winding sets. The fault control mechanism may include a fault detection circuit for detecting a failed component associated with the motor drive. The failed component may be a winding, a CPU, and/or RAM.

In still another related embodiment of the invention, the electric device may be a transporter and the motor is coupled to at least one ground contacting element of the transporter so as to propel the transporter. The transporter may be a dynamically stabilized transporter.

In accordance with another embodiment of the invention, an electric device includes a motor having a first winding set and a second winding set. A fault control circuit decouples one of the first winding set and the second winding set from all circuitry based at least on a fault condition.

In related embodiments of the invention, the fault control circuit includes at least one switch, squib, or fuse for decoupling the one of the first winding set and the second winding set from all circuitry. The at least one switch may be a relay. The at least one relay may be in a normally open position such that the one of the first winding set and the second winding set is decoupled from all circuitry when the relay is not activated. The fault condition may be a failure of a component associated with the first winding set, and the fault control circuit decouples the first winding set from all circuitry based at least on the failure. The component may be one of the first winding set, a power source, a motor drive, a sensor, a CPU, and a RAM. The fault control circuit may include a first processor associated with the first winding set; and a second processor associated with the second winding set.

In another related embodiment of the invention, the electric device may be a transporter in which case the motor is coupled to at least one ground contacting element of the transporter so as to propel the transporter. The transporter may be a dynamically stabilized transporter.

In accordance with another embodiment of the invention, a method for controlling an electric device is presented. The electric device includes a motor having a winding set. The method includes detecting a fault condition associated with the winding set, and decoupling the winding set from all circuitry based at least on the fault condition. In related embodiments of the invention, the decoupling includes controlling at least one relay, squib, and/or fuse for decoupling the winding set.

In accordance with another embodiment of the invention, a method for controlling an electric device is presented. The electric device includes a motor driven by a motor drive. The method includes detecting a fault condition in the motor drive and reducing fault torque commanded by the motor drive based at least on the fault condition.

BRIEF DESCRIPTION OF THE DRAWINGS

The foregoing features of the invention will be more readily understood by reference to the following detailed description, taken with reference to the accompanying drawings, in which:

FIG. 7 is a table showing modifications to pulse duty-cycles of various motor drive signals upon detection of a fault condition, in accordance with one embodiment of the invention;

DETAILED DESCRIPTION OF SPECIFIC EMBODIMENTS

A system and method for reducing or eliminating torque in an electric device that includes, at least in part, a motor and a motor drive, in the event of a fault condition is presented. In accordance with various embodiments of the invention, torque commanded by the motor drive associated with a fault condition may be eliminated by disconnecting the motor drive from the motor through, for example, the use of a relay, squibs, and/or fuses. In other embodiments of the invention, fault torque commanded by a motor drive associated with a fault condition may be reduced by controlling a portion of the motor drive that is still working properly, or by utilizing a motor topology that is less susceptible to fault torque. The present invention may be applied to electric devices that have various levels of redundancy, including electric devices that have no redundancy. For example, disconnection of a motor in a non-redundant electric device may be advantageous when zero torque can be tolerated but not fault torque, or when reduction of fault torque is useful if the resulting reduced fault torque is tolerable.

Figure 2:
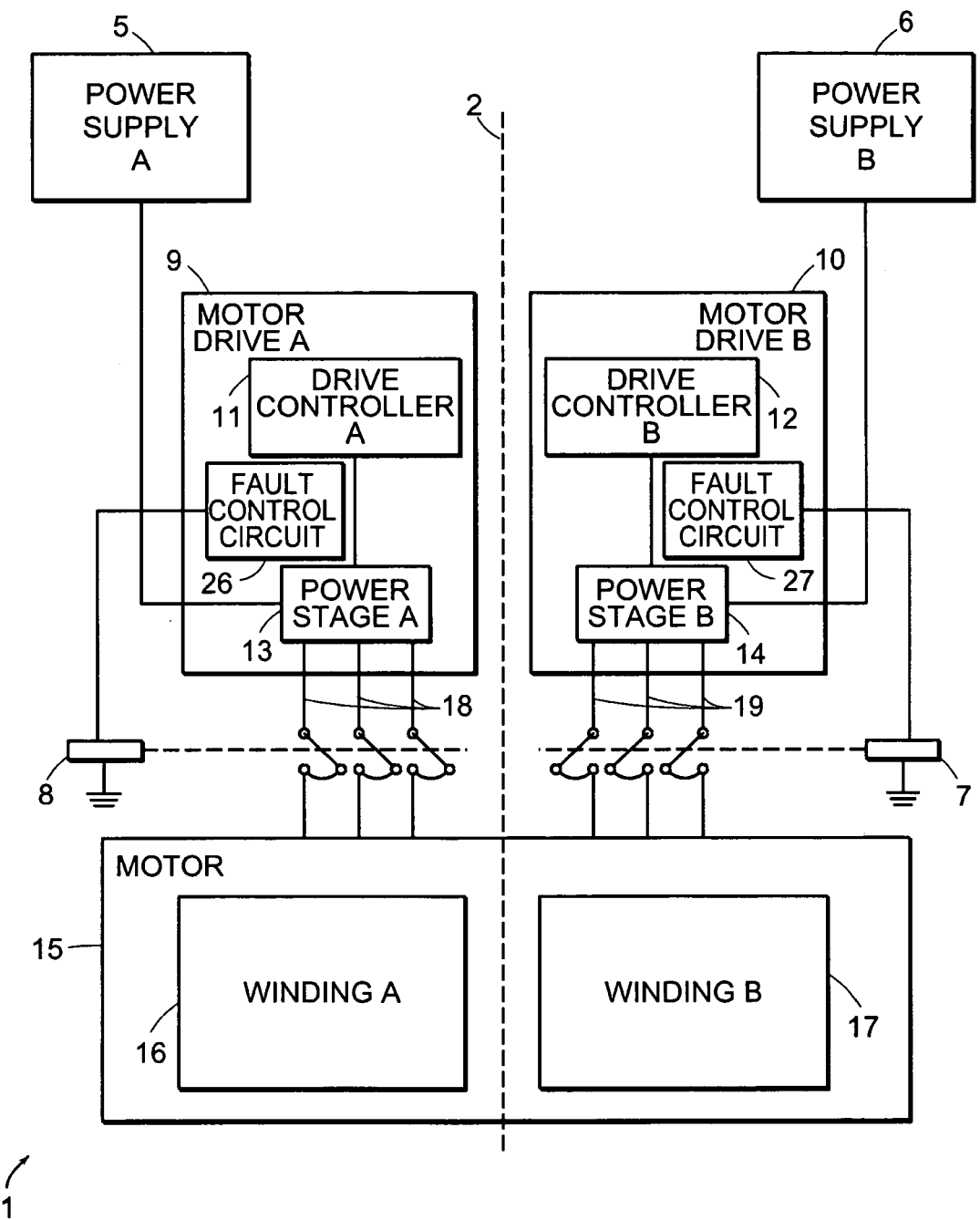
FIG. 2 is a block schematic of an electric device that includes at least one relay for decoupling a winding set of a motor, in accordance with one embodiment of the invention.

In accordance with one embodiment of the invention, FIG. 2 is a block schematic of an electric device that includes an electric motor 15. Motor 15 may be one of many types known in the art, such as an AC or DC motor and either brushed or brushless. Motor 15 has one or more winding sets 16, 17, which may be associated with either the armature or stator of motor 15. Each winding set 16, 17 may be capable of energizing the motor 15 in the event the complementary winding(s) are unable to energize the motor 15. Note that one skilled in the art will appreciate that a motor is inherently a generator, and that all further references to the term "motor," as used in this description, and in the accompanying claims, shall mean a motor or a generator, unless the context otherwise requires.

Each winding set 16, 17 is driven by a separate power source, designated by numerals 5 and 6, respectively. Power source 5, 6 may be a battery, for example, and may be external to the electric device. While redundant power sources 5, 6 are shown in FIG. 2, it is to be understood that all winding sets may be driven by a single power source. However, this results in a loss of system redundancy.

Besides having redundant power supplies, each winding set 16, 17 may also be associated with other redundant components, such as redundant motor drives. Each redundant component in FIG. 2 is distinguished by a letter, A or B, which associates the component with either winding set A 16 or winding set B 17, respectively. For clarity, components associated with winding set A are separated from components associated with winding set B by dashed line 2. Line components associated with winding set A 16 include power supply A 5, motor drive A 9, and lead lines A 18. Line components associated with winding set B include power supply B 6, motor drive B 10, and lead lines B 19.

Referring now to the line of redundant components associated with winding set A 16, motor drive A 11 ensures that the appropriate power is applied to motor 15. Motor 15, in turn, rotates a shaft. The shaft may, for example, supply a torque, τ, at an angular velocity, ω, to a wheel of a transporter that is attached to shaft. In some embodiments, a transmission may be used to scale the wheel speed in relation to the angular velocity of the shaft. Winding set A 16 is electrically connected to motor drive A 113 by leads 18 capable of conducting large currents or high voltages. It is understood that the large currents and high voltages are relative to the currents and voltages normally used in signal processing and may cover, without limitation, the range above 1 ampere or 12 volts, respectively.

Motor drive A 11 may include both a drive controller A 11 and a power stage A 13 (similarly, motor drive B 10 may include drive controller B 12 and power stage B 14). Drive controller A 11 may be configured to control either current or voltage applied to motor 15. Power stage A 13 switches power source A 5 into or out of connection with each lead 18, with the switching of power stage A 13 controlled by drive controller A 1 1.

A fault control circuit 26 is provided that isolates winding set A 16 from some, or all, drive circuitry upon detection of a fault condition that affects, or potentially affects, proper operation of winding set A 16. The fault control circuit 26 may include at least one switch 8 that is controlled so as to decouple winding set A 16 from all other circuitry upon detection of the failure. Switch 8 may be positioned so as interrupt lead lines 18, thus preventing the passing of currents between motor drive A 9 and motor 15, protecting motor 15 from potential damage or from causing uncommanded torque. In other embodiments of the invention, other lines may be interrupted based on a detected fault. For example, a switch may be positioned so as to interrupt the line connecting power source A 5 to power stage A 13.

Switch 8 may be, without limitation, a relay. The relay may be connected in a normally-open position, such that when the relay is energized motor drive A 9 is connected to winding set A 16/motor 15, and when the relay is de-activated, motor drive A 9 is decoupled from winding set A 16/motor 15.

In a similar manner, switch 7 may be controlled by fault controller 27 so as decouple winding set B 17 from some, or all, other circuitry based on detection of a fault that affects, or potentially affects proper operation of winding B 17. This may be accomplished by positioning switch 7 so as to interrupt lead lines 19 or other lines, such as the line connecting power source A 5 to power stage A 13.

Figure 3:
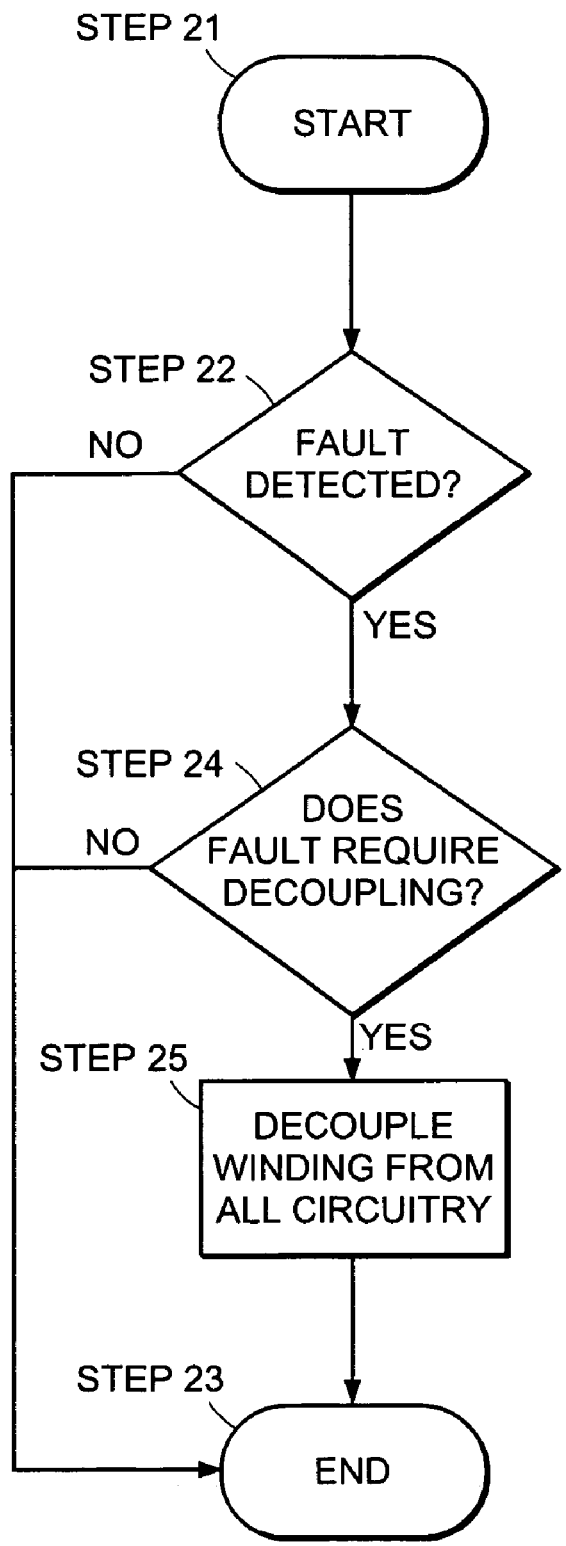
FIG. 3 is a flow diagram for decoupling one or more redundant windings of a motor from all circuitry based on detection of a fault condition, in accordance with one embodiment of the invention.

FIG. 3 is a flow diagram for controlling the decoupling of a motor winding set from all circuitry based on a detected fault or potential fault, in accordance with one embodiment of the invention. The routine may utilize, for example, a fault control circuit that is designed to connect the motor drive to the winding set/motor only when a number of components are operating properly. Such a fault control circuit will be familiar to those skilled in the art, and may include, without limitation, watchdog times and/or AC-coupled drivers, sensors and/or other electronic components. In various embodiments, the fault control circuit may include a processor located within the motor drive controller(s) 11, 12 (shown in FIG. 2), which runs control code located, for example, in memory associated with the motor drive controller(s) 11, 12. Such memory may be, for example, Random-Access Memory (RAM) or Read-Only Memory (ROM). The control program may be entered periodically by the motor drive controller.

The fault control circuit first determines whether a fault condition has been detected, step 22. A fault condition may indicate one of a variety of conditions adversely affecting proper operation of a winding/winding set. A fault may be related to the winding itself, or with the winding's associated line components. Other faults located elsewhere in the system that may affect proper operation of the winding or the winding's line components may also be detected, such as a fault pertaining to a system sensor. Examples of faults include, without limitation, a battery open condition, a CPU/RAM failure, a stopped clock, a motor winding open condition, a faulty sensor, stuck output, or a motor winding short condition.

A fault condition may indicate that a line or system component has failed. Alternatively, a fault condition may be an indication of an imminent failure of a line or system component, such as a battery over-temperature or a motor over-temperature. A wide variety of sensors known in the art may be utilized for monitoring component/system status, including, but not limited to, temperature, voltage, current, and motor shaft feedback sensors.

The fault control circuit may either continuously or periodically monitor for faults. Upon detection of a fault condition, the fault control circuit determines if the fault condition warrants decoupling of at least one winding or winding set from the drive circuitry, step 24. Such a determination may be based on, for example, the type and severity of the fault condition. For example, if the fault condition is indicative of a component failure that may occur in the distant future, the processor or control circuit may display an alert or perform further diagnostics instead of performing a decoupling operation. In various embodiments, only faults that warrant decoupling are detected, such that determination of whether a fault warrants decoupling is not required.

Upon detection of a fault condition that warrants decoupling, the fault control circuitry decouples at least one winding or winding set from some, or all, drive circuitry, step 25. As discussed above, this decoupling may be accomplished by, but not limited to, a switch which may be a relay.

In accordance with other embodiments of the invention, instead of a relay(s), squibs or fuses may be utilized to disconnect the motor from all, or portions, of the drive circuitry. Squibs and/or fuses may be advantageous, for example, when high-voltage circuits make arcing across a relay a concern, requiring intolerably large contact spacing. Furthermore, vibration prone applications may make it difficult to keep a relay in an open or closed position.

Figure 4:
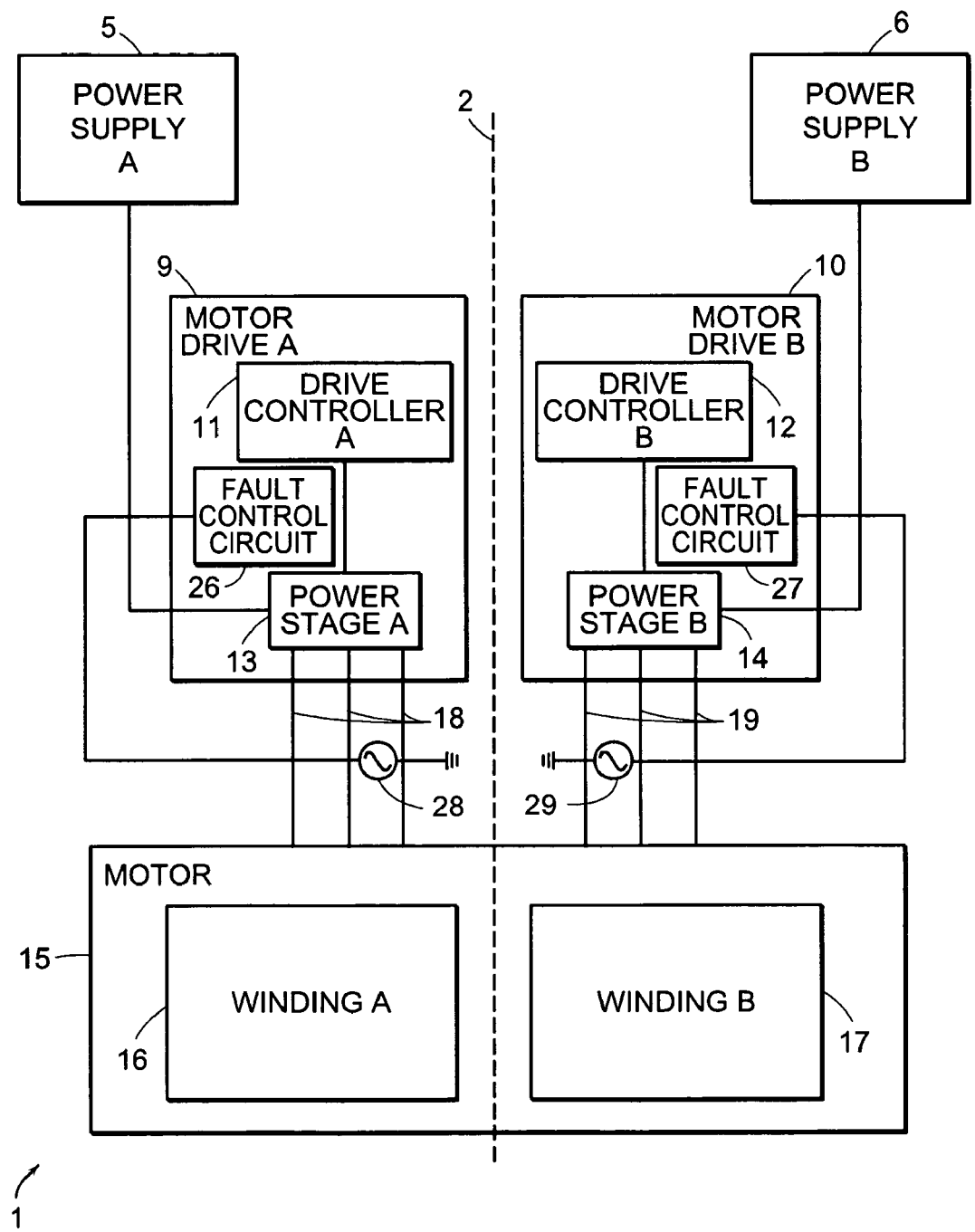
FIG. 4 is a block schematic of an electric device that includes at least one squib for decoupling a winding set of the motor, in accordance with one embodiment of the invention.

FIG. 4 is a block schematic that includes one or more squibs 28, 29 to decouple at least one winding or winding set 16, 17 from the motor drive 9, 10, respectively, in accordance with one embodiment of the invention. The squibs 28, 29 include an explosive charge that can be electrically triggered by the fault control circuit 26, 27, respectively, upon detection of a fault. The squibs may be positioned so that upon detonation, the winding(s) or winding set(s) are isolated from the motor drive. Similar to the positioning of the switch as discussed above, the squib 28 may be positioned so as interrupt lead lines 18 thus preventing the passing of currents between motor drive A 9 and motor 15, protecting motor 15 from potential damage or from causing uncommanded torque. In other embodiments of the invention, other lines may be interrupted based on a detected fault. For example, a squib may be positioned so as to interrupt the line connecting power source A 5 to power stage A 13. Unlike the use of a relay, once detonated, circuitry disrupted by the exploded squib will require repair before subsequent use.

Figure 5:
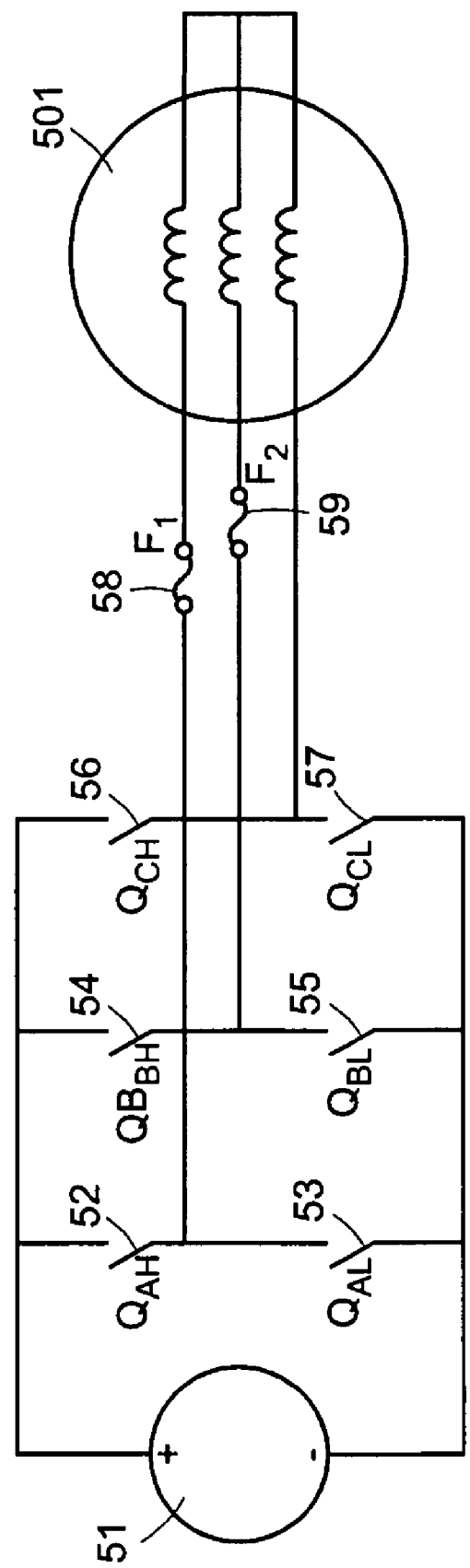
FIG. 5 is a block schematic of an electric device that includes at least one fuse for decoupling a winding set of a motor, in accordance with one embodiment of the invention.

In accordance with another embodiment of the invention, at least one fuse 58, 59 may be utilized instead of a relay, as shown in FIG. 5. The fuses 58, 59 may be positioned, for example, in series with lead lines positioned between the motor drive and the winding set of motor 501. Upon detection of a fault, the fault control circuit (not shown) that controls switches 52–57 will intentionally cause enough current from power supply 51 to blow the fuses 58, 59.

For example, in the electric device shown in FIG. 5, closing upper switches $Q_{AH}$ 52 and $Q_{BH}$ 54, and lower switch $Q_{CL}$ 57 causes current to flow through, and blow, fuses $F_1$ 58 and $F_2$ 59. In preferred embodiments, the duration of the current provided is quick enough so that other electric components in the electric device are not adversely affected.

Figure 6:
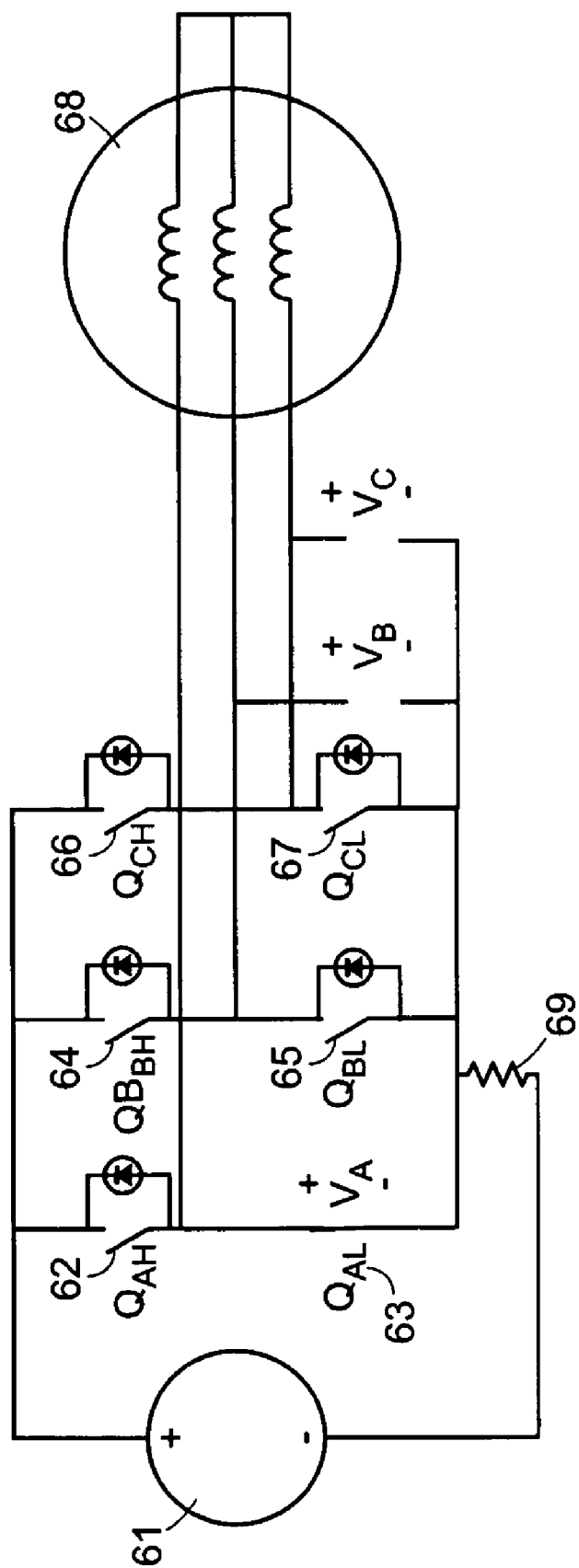
FIG. 6 is a block schematic of an electric device having a fault control circuit that controls, upon detection of a fault condition, a motor drive so as to reduce fault torque.

Instead of eliminating torque commanded by the faulted motor drive, the torque may be reduced by controlling a portion of the motor drive that is still working properly, or by utilizing a motor topology that is less susceptible to fault torque. In accordance with one embodiment of the invention, FIG. 6 is a schematic of a 3 phase permanent-magnet motor 68 and motor drive that includes fault control circuitry (not shown) that controls switches 62–67 so as to reduce fault torque commanded in the event of a motor drive failure. Fault torque may occur, for example, if $Q_{AL}$ 63 shorts, since current flows through the antiparallel diodes associated with $Q_{BL}$ 65 and $Q_{CL}$ 67 during periods of the motor's 68 rotation, which in turn causes drag torque in the 3 phase permanent-magnet motor 68. The fault control circuitry senses a short in one of the switches 62–67 by pulsing each switch in sequence. When a complementary switch closes (for example, $Q_{AH}$ 62 in FIG. 6) a large current will flow and the shorted switch ($Q_{AL}$ in FIG. 6) can be sensed using resistor $R_{sense}$ 69. The pulse time is kept short, for example, a few microseconds, to ensure that the switches, which are typically transistors, are not damaged. Once a faulted switch has been determined, the common-mode voltage applied to the motor 68 can be adjusted so as to accommodate the failure.

For example, in the system of FIG. 6, which has a 100V power supply 61, assume it is intended that 5v, 40v, and 95v be applied to the A, B, and C phases, respectively, by controlling the switches 62–67 with pulse waveforms. If a shorted switch ($Q_{AL}$ 63 in FIG. 6) is detected, the pulse duty cycles applied to the switches 62–67 can be adjusted to accommodate the short, as show in FIG. 7, in accordance with one embodiment of the invention. By adjusting each pulse duty cycle by the same amount such that the shorted switch has a desired duty cycle of 100%, the line-line voltages are preserved even though there is a short circuit ($V_{BA}$=35 volts, $V_{CA}$=90 volts in both cases). Note that this is possible for only one third of the commutation cycle, when $V_A \leq V_B$ and $V_A \leq V_C$. During the rest of the cycle, voltage distortion occurs, which causes undesired current and undesired torque.

Figure 8:
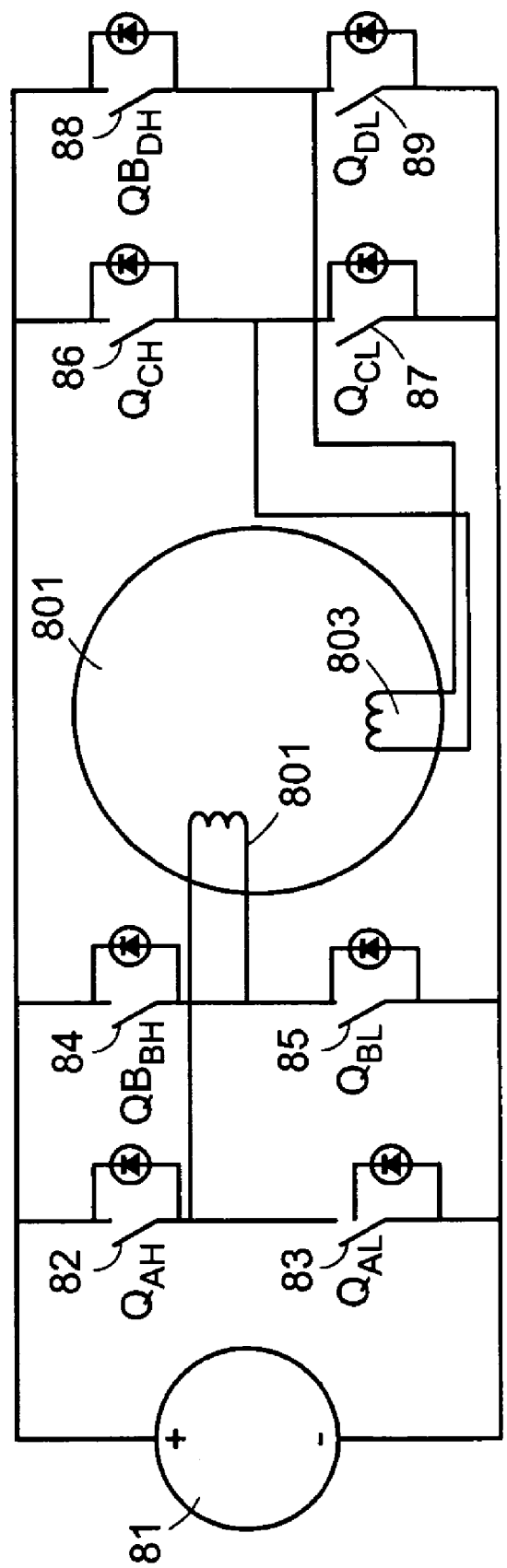
FIG. 8 is a block schematic of a motor topology that is less susceptible to fault torque, in accordance with one embodiment of the invention.

FIG. 8 is a schematic of a motor topology that is less susceptible to fault torque, in accordance with one embodiment of the invention. Rather than using a 3-phase motor, as shown in FIG. 7, the use of a two-phase motor 801 helps isolate a fault. Control of switches 82–89 allow current from power supply 81 to pass to windings AB 802 and CD 803. A short in one of the switches 82-89 affects only one of the windings 802, 803. For example, if $Q_{AL}$ shorts, the AB winding 801 is susceptible to fault torque, but not the CD 803 winding. This approach can be combined with reducing the fault torque commanded, as described above with regards to FIG. 7. For example, if $Q_{AL}$ 83 shorts, the duty cycle on the B-phase can be adjusted so as maintain a desired line-line voltage $V_{AB}$.

Figure 9:
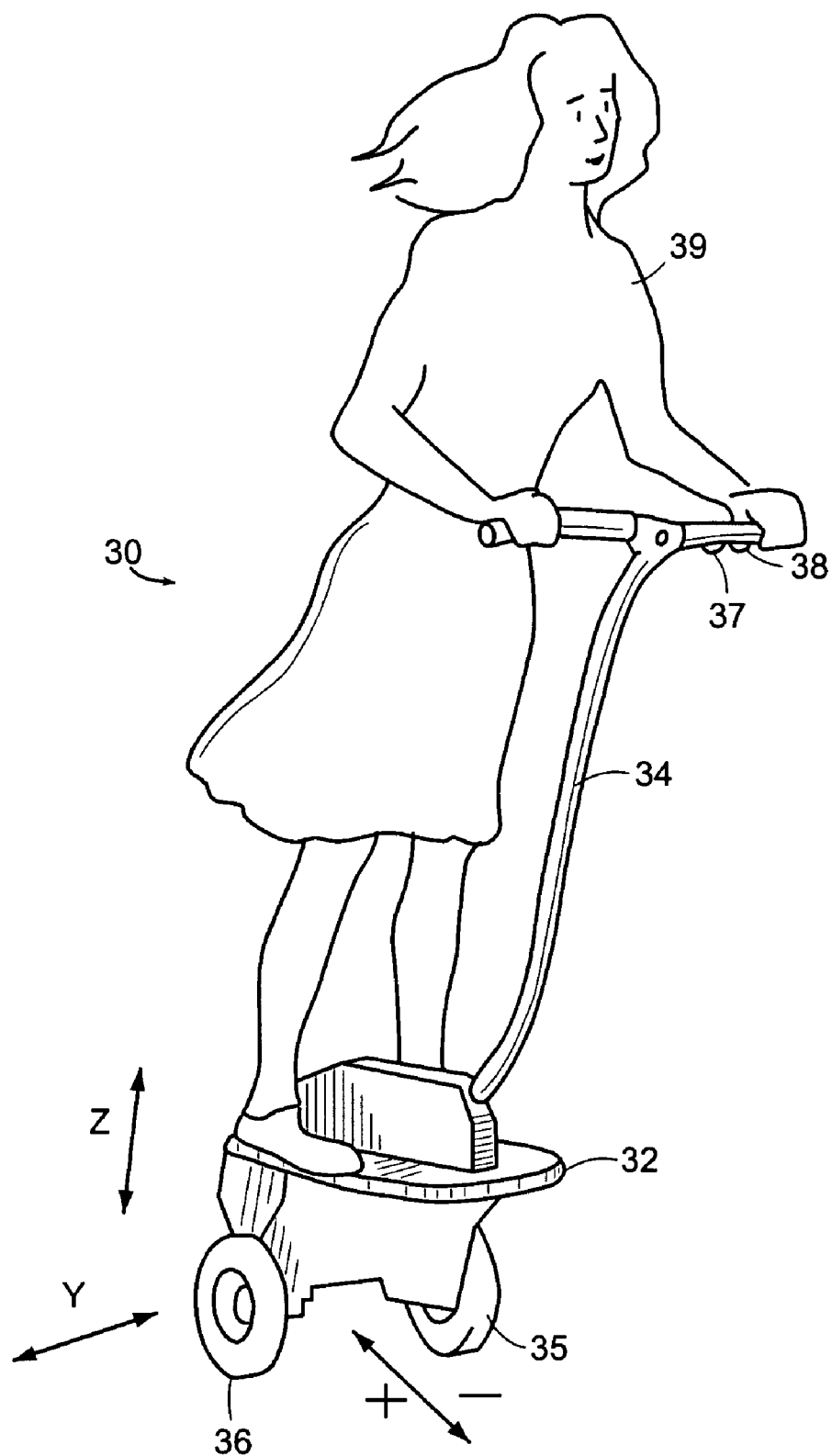
FIG. 9 depicts a balancing transporter to which the present invention may advantageously be applied.
Figure 10:
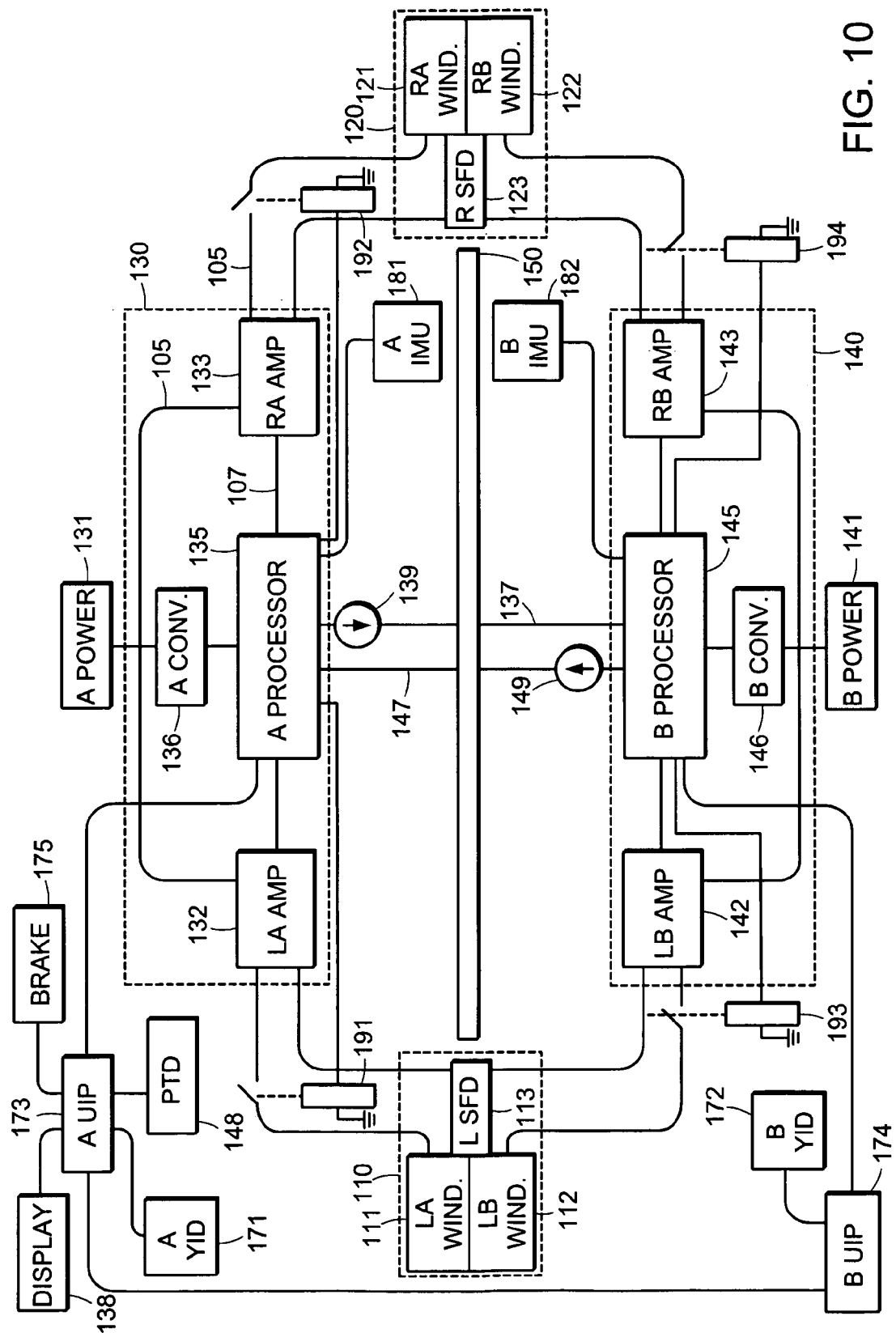
FIG. 10 is a block diagram of the system architecture of a balancing transporter in accordance with one embodiment of the invention.

FIG. 9 shows a balancing personal transporter 30 to which the present invention may advantageously be applied. Transporter 30 is statically unstable with respect to tipping and requires operation of a control loop to maintain dynamic stability, Transporter 30 is described in U.S. Pat. Nos. 5,701,965, 5,971,091, and 6,288,505 B1, which are incorporated herein by reference in their entirety.

Transporter 30 includes a support platform 32 for supporting a load, which may include a living subject 38, over the ground or other surface, such as a floor, which may be referred to herein generally as "ground". A subject 38, for example, may stand or sit on support platform 32. Ground-contacting elements, which may be wheels 35 and 36, are shown as coaxial about the Y-axis. Attached to support platform 32 may be a handlebar 34 that can be gripped when riding transporter 10. Rider may control the fore-aft movement of the transporter by leaning. Steering or other control may be provided by thumbwheels 37 and 38, or by other user input mechanisms.

Transporter 30 includes a control system that actively maintains stability while the transporter 30 is operating. If the transporter 30 loses the ability to maintain stability, such as through the failure of a component, the safety of the rider may be at risk. Accordingly, the transporter 30 provides redundant architecture wherein critical components, such as the batteries, motor windings, and motor drives are replicated and run in parallel during operation of the transporter 30. If a failure in occurs in one line of components, the parallel line may still maintain the stability of the transporter 30, at least for a short period of time so as to allow the rider to bring the transporter to a safe stop. For example, if each winding and associated motor drive causes a desired torque of $T_{desired}/2$, such that the total torque delivered is $T_{desired}$ before the fault, and one winding and/or drive fails and causes a torque $T_{fault}$, then the other winding/drive must have the ability to provide a torque $T_{desired} - T_{fault} + \delta$, where $\delta$ is small enough to maintain control of the motor. In various embodiments, due to the current or voltage associated with a failed component line, a failure, such as a short in the motor windings, may induce additional failures that cause the transporter 30 to malfunction. It may thus be advantageous to decouple the winding from all circuitry based on a failure associated with either the winding and/or the winding's line components.

Figure 1:
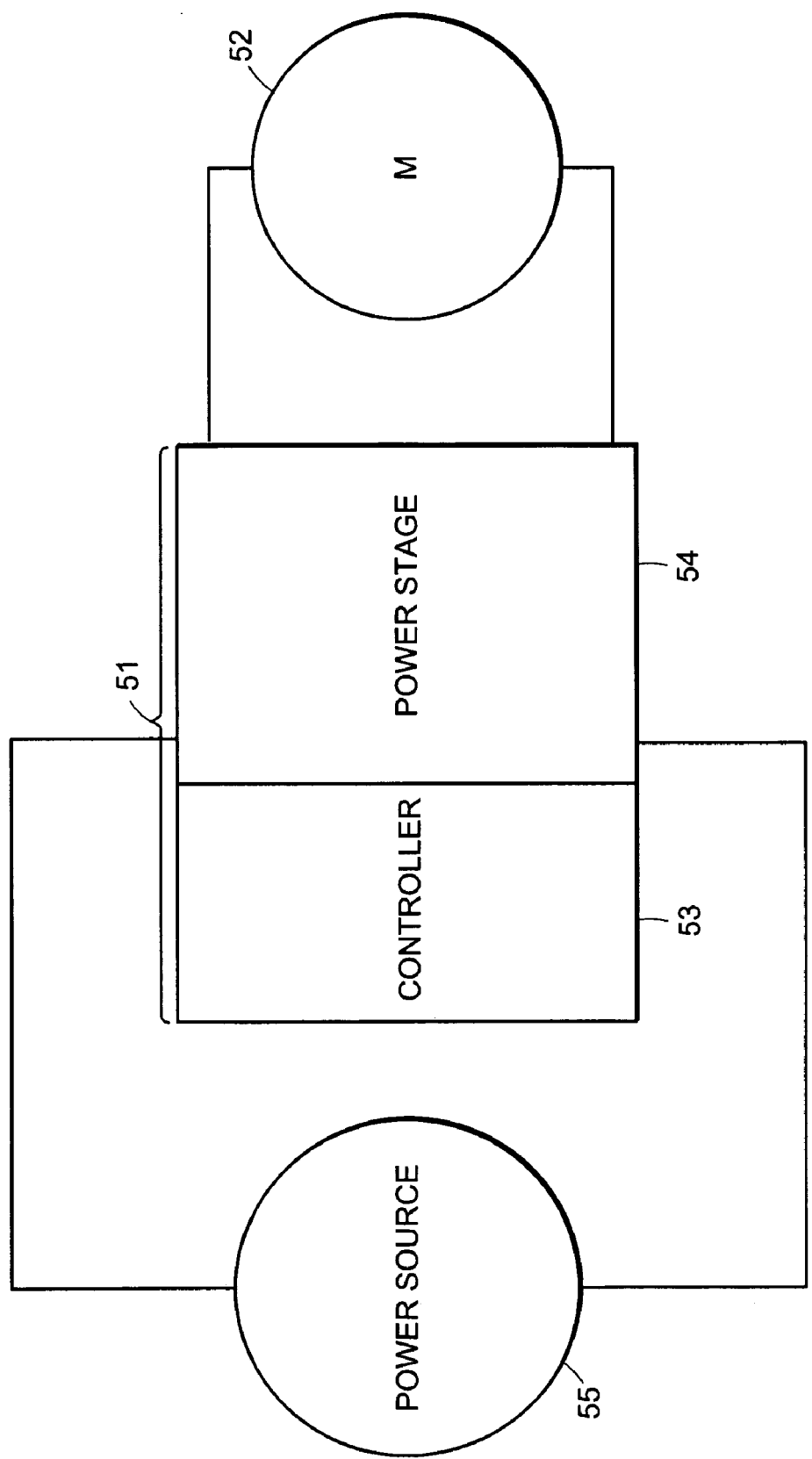
FIG. 1 is a block schematic of an electric device (prior art)

Referring now to FIG. 7, a block diagram of the transporter's system architecture is shown, in accordance with an embodiment of the present invention. A left motor 110 is coupled to a left wheel 35 (shown in FIG. 1) and a right motor 120 is coupled to a right wheel 36 (wheels shown in FIG. 1). Each motor 110, 112 includes a redundant set of windings 111, 112 and 121, 122, respectively. Each winding 111, 112, 121, 122 and associated motor drive is capable of energizing the motor in the event the complimentary winding is unable to energize the motor. In the discussion below, each redundant component is distinguished by a two letter group identifying either the left (L) or right (R) side of the transporter and either the A group or B group of redundant components. For example, the left motor winding energized by the A group of components is designated as the LA winding.

Each motor winding 111, 112, 121, 122 is driven by a motor drive 132, 133, 142, 143. Motor drives 132, 133 are supplied by the A-group power supply 131 and motor drives 142, 143 are supplied by the B-group power supply 141. The electrical connections between the power supplies and the motor drives and between the motor drives and motor windings are expected to carry large currents up to 20 to 40 Amperes and are identified by thick lines 105 in FIG. 4.

The A-group motor drives 132, 133 are commanded by the A processor 135 while the B-group motor drives 142, 143 are commanded by the B processor 145. Power is supplied to the A processor from the A power source 131 through the A-group DC-DC converter 136. Similarly, the B power source 141 supplies power to the B processor 146 through the B-group DC-DC converter 145. The A-group motor drives 132, 133, A-group converter 136, and A processor 135 are preferably grouped together into a compartment or tray 130 that is at least partially isolated by a barrier 150 from the B-tray 140 containing the B-group motor drives 142, 143, B-group converter 146, and B processor 145. Physically separating the A tray 130 and B tray 140 reduces the probability of a common point failure. The barrier 150 acts to delay the propagation of a failure, in one tray to the other tray such that the transporter has sufficient time to put the rider in a safe condition to exit the transporter. Similarly, the A power supply 131 is physically separated from the B power supply 141. The A power supply 131 and the components in the A tray 130 are capable of driving both motors 110, 120 for at least a short period of time, in the event of a failure in any one of the B-group components. Conversely, the B power supply 141 and the components in the B tray 140 are capable of driving both motors 110, 120 for at least a short period of time if an A-group component fails.

Although the processors 135, 145 are physically isolated from each other, signal communication is maintained between the processors via communication channels 137, 147. Communication channels 137, 147 are preferably electrical conductors but may also be electromagnetic such as optical, infrared, microwave, or radio. The A channel 137 transmits signals from the A processor 135 to the B processor 145 and the B channel 147 transmits signals from the B processor 145 to the A processor 135. Optical isolators 139, 149 are incorporated into channels 137, 147 to prevent over-voltages from propagating from a shorted processor to the other processor.

Each processor receives signals from a plurality of sensors that monitor the state of the transporter and the input commands of the rider. The processor uses the sensor signals to determine and transmit the appropriate command to the motor amplifiers. Additionally, the processor uses the sensor signals to identify failures, or potential failures. Depending on the importance of the sensor to the operation of the transporter, the sensors may or may not be duplicated for redundancy. For example, the spatial orientation of the transporter is central to the operation of the transporter, and therefore an A-group IMU 181 supplies transporter orientation information to the A processor 135 and a B-group IMU 182 supplies transporter orientation information to the B-processor 145. On the other hand, the transporter may still be operated in a safe manner without the PTD 148 so only one such device is typically provided. Similarly, an output device such as a display 138 does not require redundancy. A non-redundant device such as a display 138 or a PTD 148 may be connected to either processor or may be switched between processors.

In the embodiment depicted in FIG. 4, display 138 is controlled by the A processor 135 and the PTD 148 is in direct signal communication with the B processor 145. The information provided by the PTD 148 is transmitted by the B processor 145 to the A processor 135 via the B channel 147.

Additionally, each processor 135, 145 communicates with one of the user interface processors (UIPs) 173, 174. Each UIP 173, 174 receives steering commands from the user through one of the yaw input devices 171, 172. An A-group UIP 173 also communicates to the non-redundant UIDs such as the display 138, brake switch 175, and pitch trim control 148. Other user interface devices that are not provided redundantly in the embodiment shown in FIG. 4, such as a sound warning device, lights, and an on/off switch, may also be connected to the A-group UIP 173. The A-group UIP 173 may also pass along information provided by the user interface devices to the B-group UIP 174. In accordance with one embodiment, the A-group UIP 173 compares calculations of the A-group processor with calculations of the B-group processor and queries the A-group processor 135 with a 'watchdog' calculation to verify operation of the A-group processor. Similarly, the B-group UIP 174 queries the B-group processor 145 to verify normal operation of the B-group processor.

Each processor 135, 145 executes code, as discussed in above embodiments of the present invention, to decouple its associated winding from all circuitry based upon indications of a relevant failure. In particular, A processor 135 controls relay 191 and 192, while B processor controls relays 193 and 194. Opening relays 191, 192, 193 or 194 isolates LA winding 111, RA winding 121, LB winding 112, and RB winding 122 from all circuitry, respectively. This prevents the transfer of erroneous current to or from the winding. Thus, additional faults may be prevented. Continued operation of the motor upon loss of power to one of the motor's windings is achieved via the motor's at least one other redundant winding, since each redundant winding is coupled to a motor drive via a different switch. In other embodiments, instead of a relay, squibs or fuses may be used to isolate the windings, or circuitry may be utilized to reduce fault torques, as described in above embodiments.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. An electric device comprising:
   a motor having a first winding set and a second winding set, the first winding set and the second winding set being redundant; and
   a fault control circuit for decoupling one of the first winding set and the second winding set from all circuitry, including from each other, based at least on a fault condition.

2. The electric device according to claim 1, wherein the fault control circuit includes at least one switch for decoupling the one of the first winding set and the second winding set from all circuitry.

3. The electric device according to claim 2, wherein the at least one switch is a relay.

4. The electric device according to claim 3, wherein the at least one relay is in a normally open position such that the one of the first winding set and the second winding set is decoupled from all circuitry when the relay is not activated.

5. The electric device according to claim 1, wherein the fault control circuit includes at least one squib for decoupling the one of the first winding set and the second winding set.

6. The electric device according to claim 1, wherein the fault control circuit includes at least fuse for decoupling the one of the first winding set and the second winding set.

7. The electric device according to claim 1, wherein the fault condition is a failure of a component associated with the first winding set, and the fault control circuit decouples the first winding set from all circuitry based at least on the fault condition.

8. The electric device according to claim 7, wherein the component is one of the first winding set, a power source, a motor drive, a sensor, a CPU, and a RAM.

9. The electric device according to claim 1, further comprising a controller, the controller including:
   a first processor associated with the first winding set; and
   a second processor associated with the second winding set.

10. The electric device according to claim 1, wherein the electric device is a transporter and the motor is coupled to at least one ground contacting element of the transporter so as to propel the transporter.

11. The transporter according to claim 10, wherein the transporter is a dynamically stabilized transporter.

* * * * *